United States Patent
Cho et al.

(10) Patent No.: US 12,318,767 B2
(45) Date of Patent: Jun. 3, 2025

(54) TEXTILE MATERIAL-BASED POROUS WATER SPLITTING CATALYST AND PREPARATION METHOD THEREFOR

(71) Applicant: Korea University Research and Business Foundation, Seoul (KR)

(72) Inventors: Jinhan Cho, Seoul (KR); Younji Ko, Gunpo-si (KR)

(73) Assignee: Korea University Research and Business Foundation, Seoul (KR)

(*) Notice: Subject to any disclaimer, the term of this patent is extended or adjusted under 35 U.S.C. 154(b) by 808 days.

(21) Appl. No.: 17/605,312

(22) PCT Filed: Apr. 8, 2020

(86) PCT No.: PCT/KR2020/004754
§ 371 (c)(1),
(2) Date: Oct. 21, 2021

(87) PCT Pub. No.: WO2020/222435
PCT Pub. Date: Nov. 5, 2020

(65) Prior Publication Data
US 2022/0184592 A1 Jun. 16, 2022

(30) Foreign Application Priority Data
Apr. 30, 2019 (KR) .......... 10-2019-0050865

(51) Int. Cl.
*B01J 35/58* (2024.01)
*B01J 23/755* (2006.01)
(Continued)

(52) U.S. Cl.
CPC ............. *B01J 35/58* (2024.01); *B01J 23/755* (2013.01); *B01J 35/19* (2024.01); *B01J 35/23* (2024.01);
(Continued)

(58) Field of Classification Search
CPC . B01J 35/58; B01J 35/19; B01J 35/393; B01J 35/23; B01J 23/755; C25D 3/12;
(Continued)

(56) References Cited

U.S. PATENT DOCUMENTS

2021/0265637 A1* 8/2021 Cho .................. H01M 4/92

FOREIGN PATENT DOCUMENTS

| CN | 107376945 A | 11/2017 |
| JP | 2016-56407 A | 4/2016 |

(Continued)

OTHER PUBLICATIONS

Xing, Zhicai, et al. "Experimental and theoretical insights into sustained water splitting with an electrodeposited nanoporous nickel hydroxide@ nickel film as an electrocatalyst." Journal of materials chemistry A 5.17 (2017): 7744-7748.*

(Continued)

*Primary Examiner* — Richard M Rump
(74) *Attorney, Agent, or Firm* — NSIP Law

(57) ABSTRACT

The present invention relates to a textile material-based porous water splitting catalyst and a preparation method therefor, and the textile material-based porous water splitting catalyst according to the present invention comprises: a porous textile support (10) formed by the inter-crossing of a plurality of fibers (11); binding layers (20) formed on the surface of the fibers (11); conductive layers (30) comprising nanoparticle layers (31), which comprise metal nanoparticles and are formed on the binding layers (20), and monomolecular layers (33), which comprise a monomolecular material containing an amine group (NH2) and are formed on the nanoparticle layers (31); and catalyst layers (40) which comprises a catalytic metal, and which is formed on the conductive layers (30) by the electroplating of the catalytic metal.

14 Claims, 13 Drawing Sheets

(51) Int. Cl.
| | |
|---|---|
| *B01J 35/00* | (2006.01) |
| *B01J 35/23* | (2024.01) |
| *B01J 35/30* | (2024.01) |
| *C25D 3/12* | (2006.01) |
| *D06B 3/10* | (2006.01) |
| *D06M 11/83* | (2006.01) |
| *D06M 13/332* | (2006.01) |
| *D06M 15/61* | (2006.01) |
| *B82Y 30/00* | (2011.01) |
| *B82Y 40/00* | (2011.01) |
| *D06M 101/06* | (2006.01) |

(52) U.S. Cl.
CPC .............. *B01J 35/393* (2024.01); *C25D 3/12* (2013.01); *D06B 3/10* (2013.01); *D06M 11/83* (2013.01); *D06M 13/332* (2013.01); *D06M 15/61* (2013.01); *B82Y 30/00* (2013.01); *B82Y 40/00* (2013.01); *D06M 2101/06* (2013.01)

(58) Field of Classification Search
CPC ......... D06B 3/10; D06M 11/83; D06M 15/61; D06M 2101/06; D07M 13/332; B82Y 30/00; B82Y 40/00
See application file for complete search history.

(56) References Cited

FOREIGN PATENT DOCUMENTS

| KR | 10-2005-0058408 A | 6/2005 |
|---|---|---|
| KR | 10-1724690 B1 | 4/2017 |
| KR | 10-2018-0046529 A | 5/2018 |
| KR | 10-1877681 B1 | 7/2018 |

OTHER PUBLICATIONS

Guo, Dingyi, et al. "Surface Electrochemical Modification of a Nickel Substrate to Prepare a NiFe-based Electrode for Water Oxidation." ChemSusChem 10.2 (2017): 394-400.*

Mellsop, Sophia R., et al. "Structure and transformation of oxyhydroxide films on Ni anodes below and above the oxygen evolution potential in alkaline electrolytes." Electrochimica Acta 168 (2015): 356-364.*

Wang, Man-Ling, et al. "Gold nanoparticles immobilized in hyperbranched polyethylenimine modified polyacrylonitrile fiber as highly efficient and recyclable heterogeneous catalysts for the reduction of 4-nitrophenol." Journal of Materials Chemistry A 1.19 (2013): 5923-5933.*

Sahasrabudhe, Atharva, et al., "Value added transformation of ubiquitous substrates into highly efficient and flexible electrodes for water splitting," *Nature communications*, 9, 1, 2018 (pp. 1-14).

International Search Report issued on Jul. 30, 2020 in counterpart International Patent Application No. PCT/KR2020/004754 (2 pages in English and 2 pages in Korean).

Chinese Office Action issued on Sep. 7, 2024, in counterpart Chinese Patent Application No. 202080032401.9 (12 pages in English, 12 pages in Chinese).

* cited by examiner

[Fig. 1]
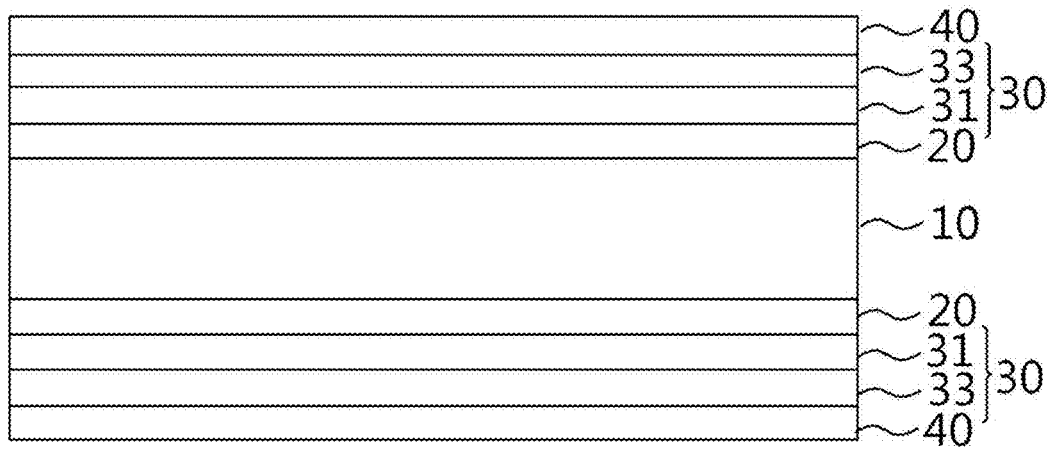
[Fig. 2]
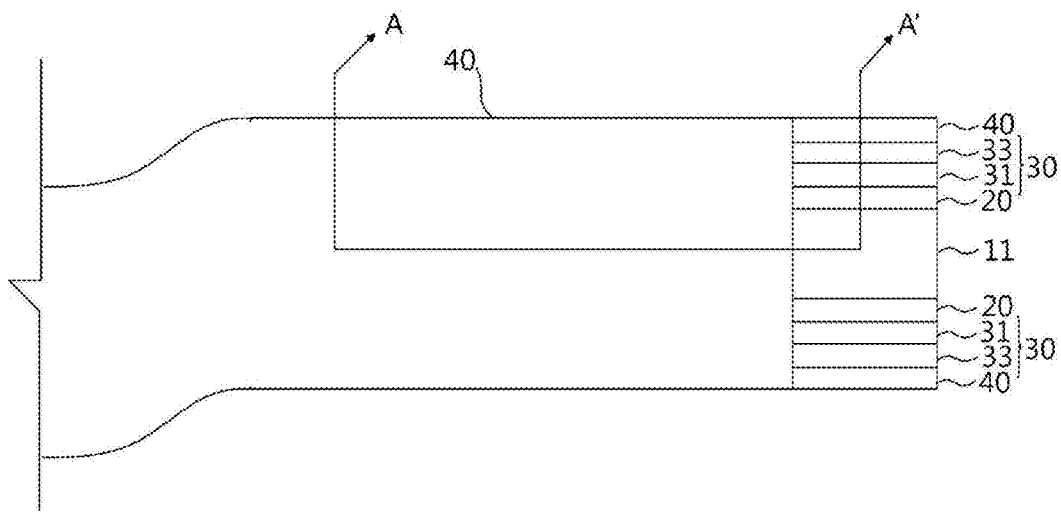
[Fig. 3]
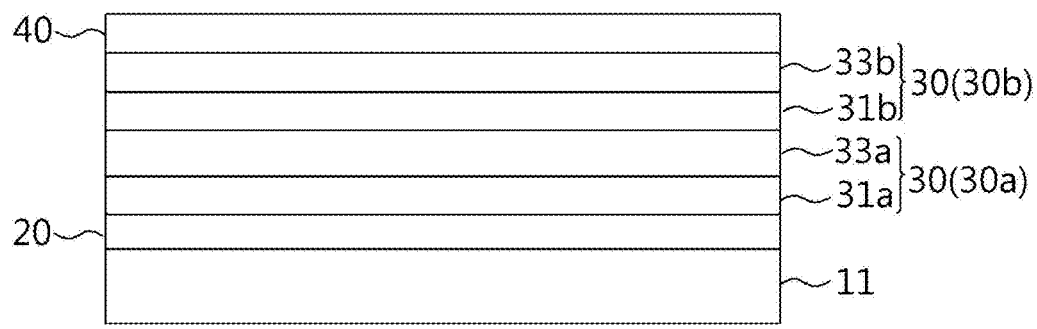

[Fig. 4]
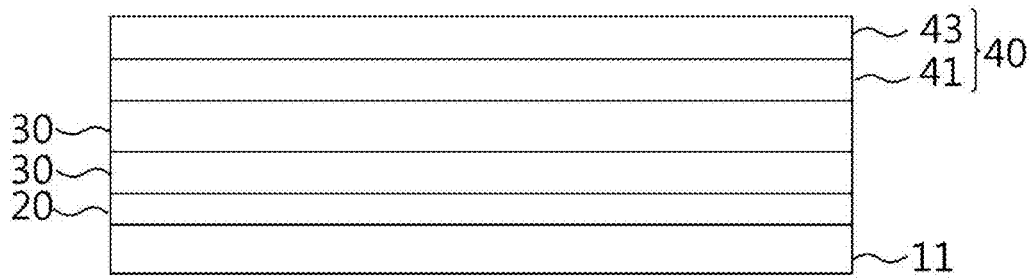
[Fig. 5]
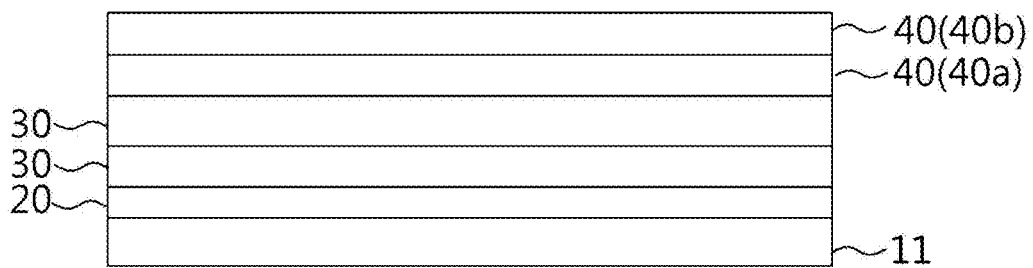
[Fig. 6]
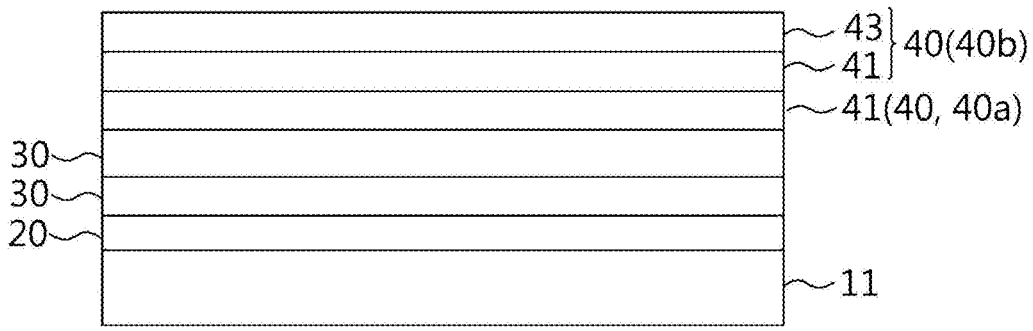

[Fig. 7]
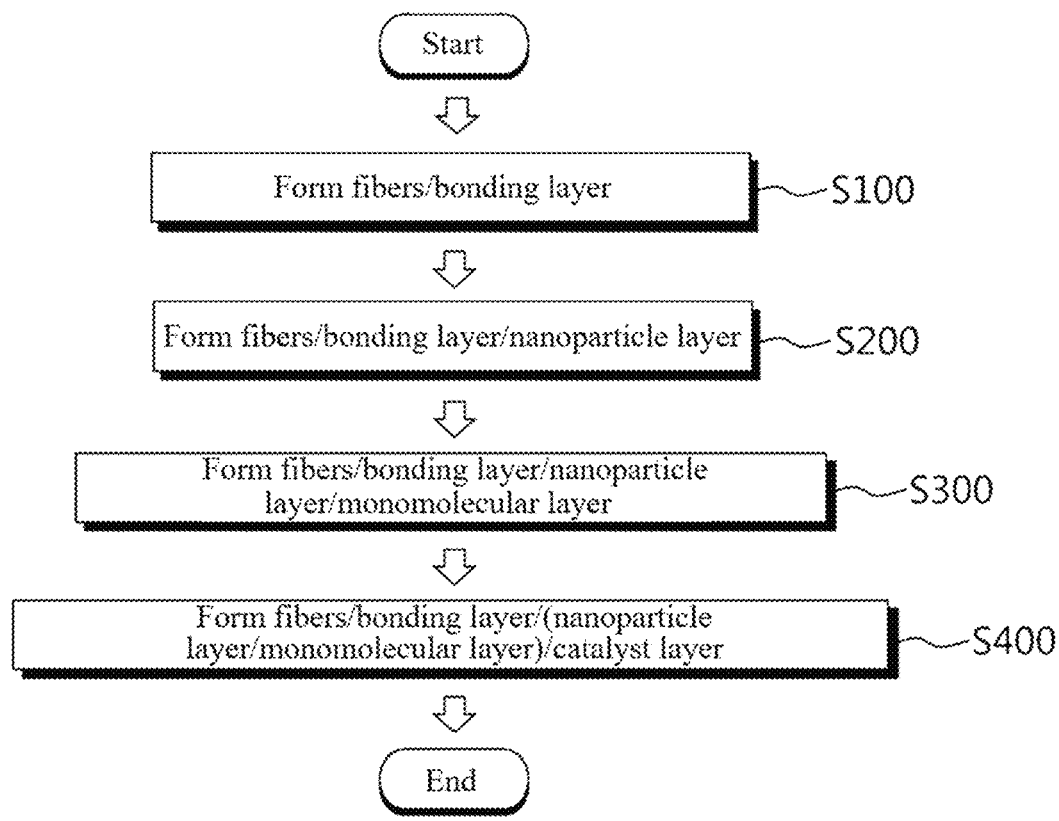
[Fig. 8]
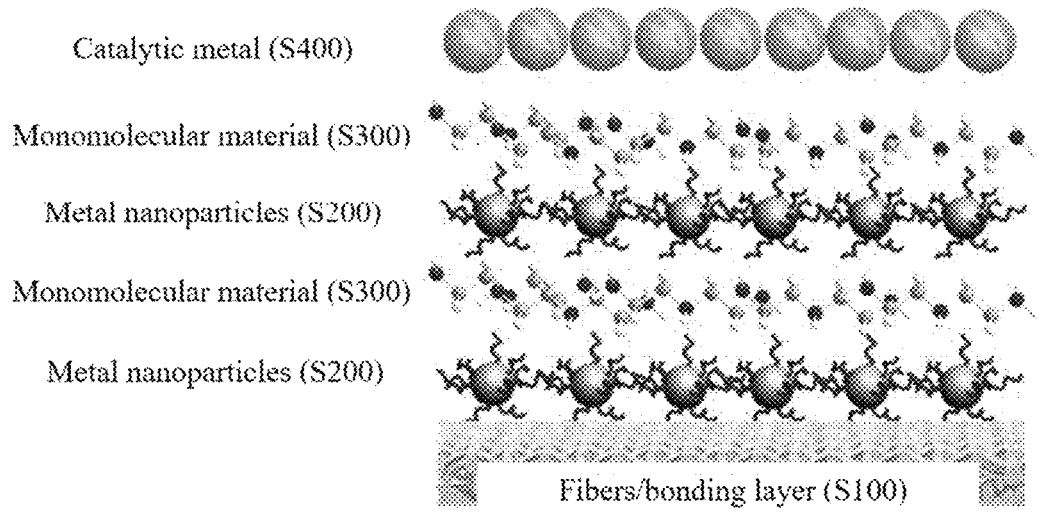

[Fig. 9]
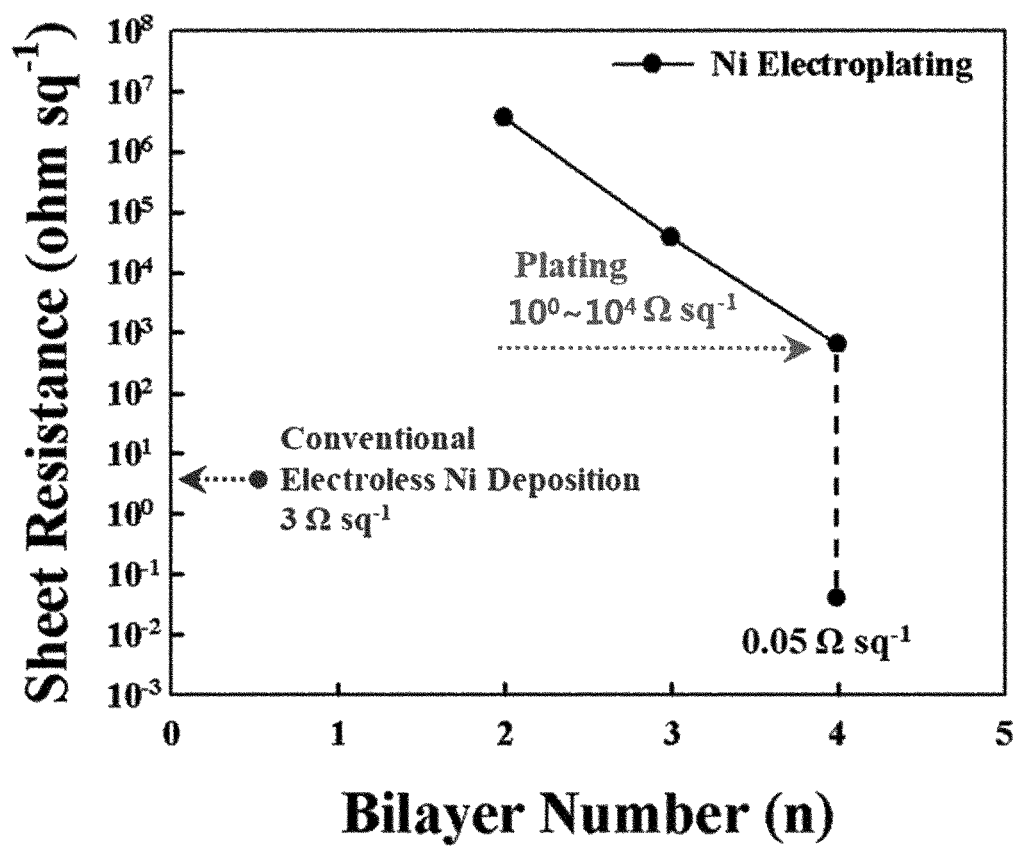

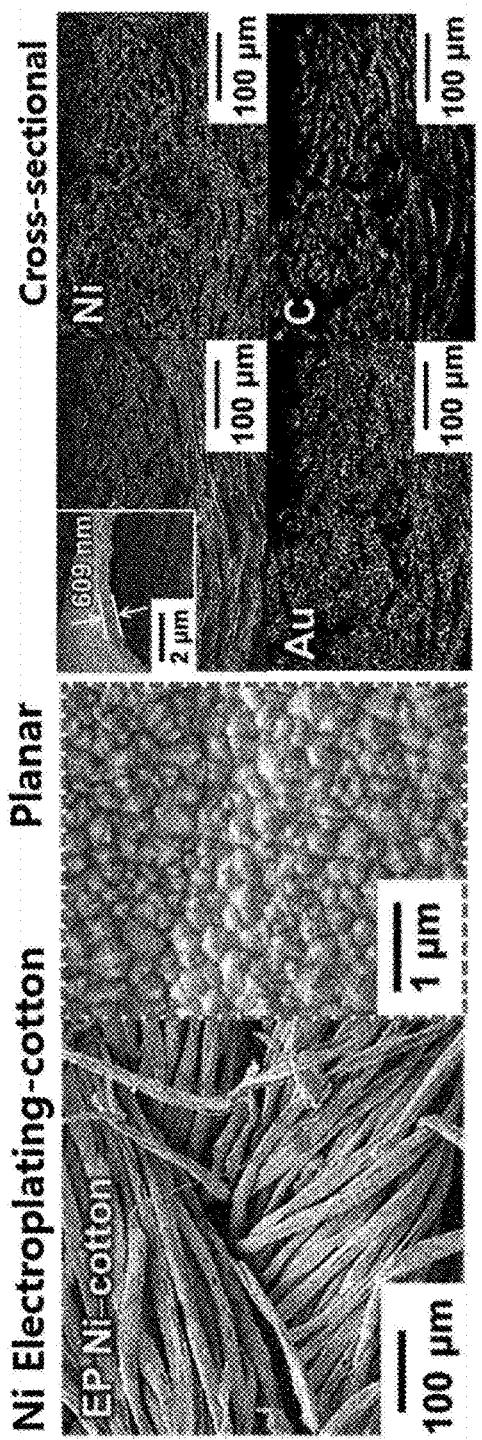
[Fig. 10a]

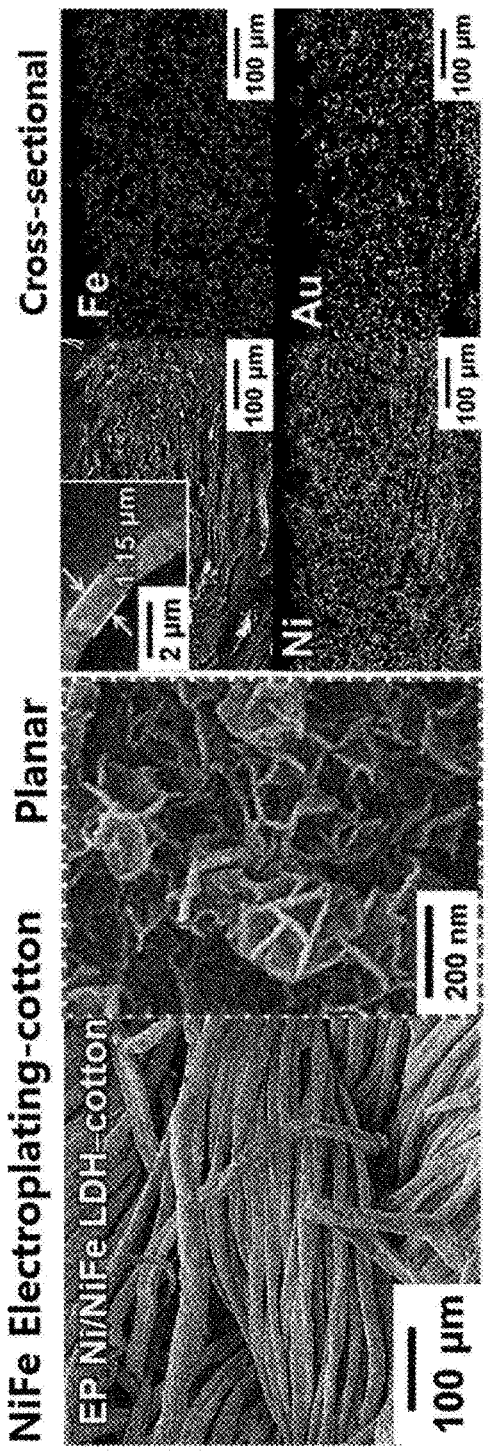
[Fig. 10b]

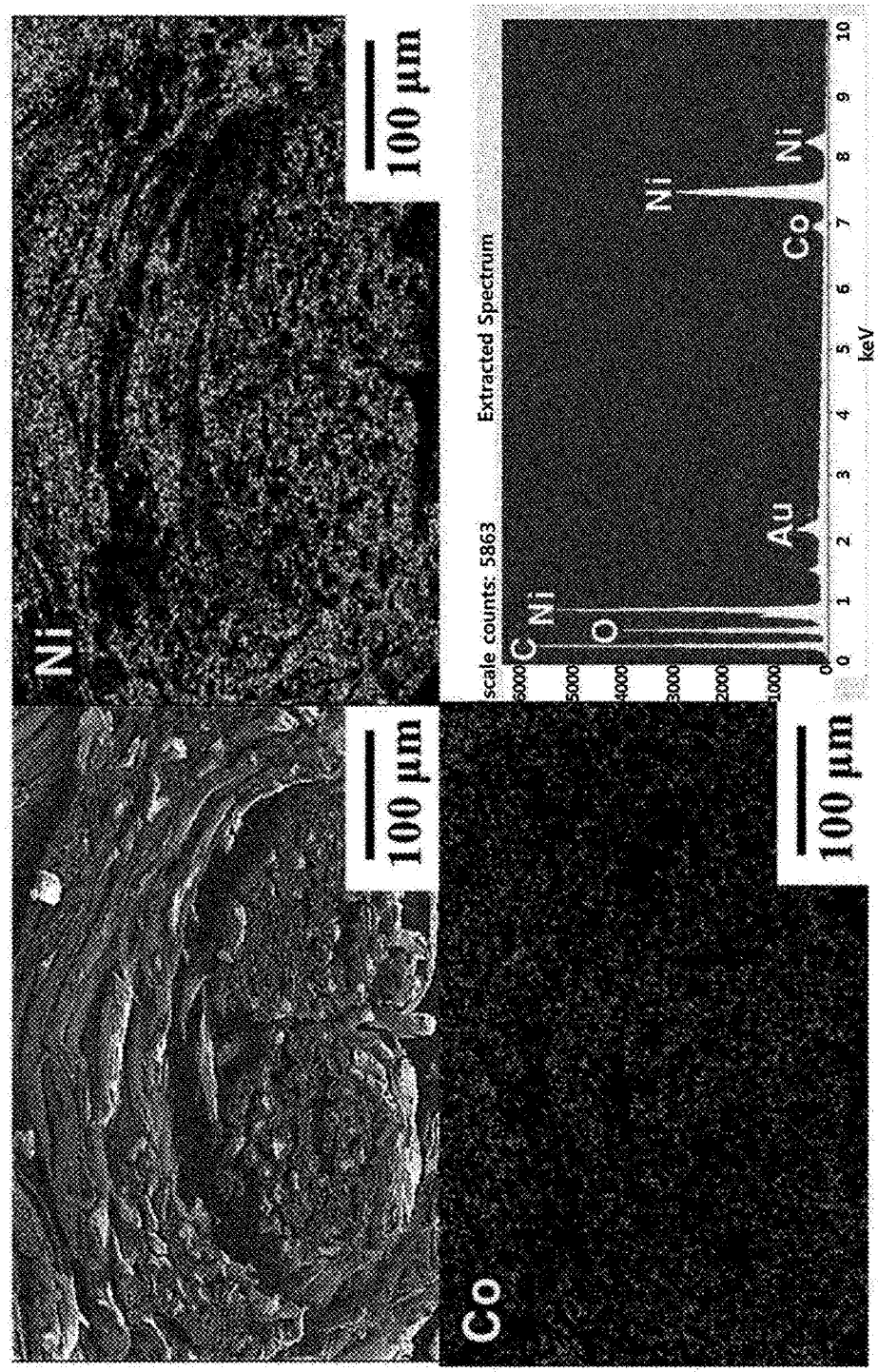
[Fig. 10c]

[Fig. 11a]
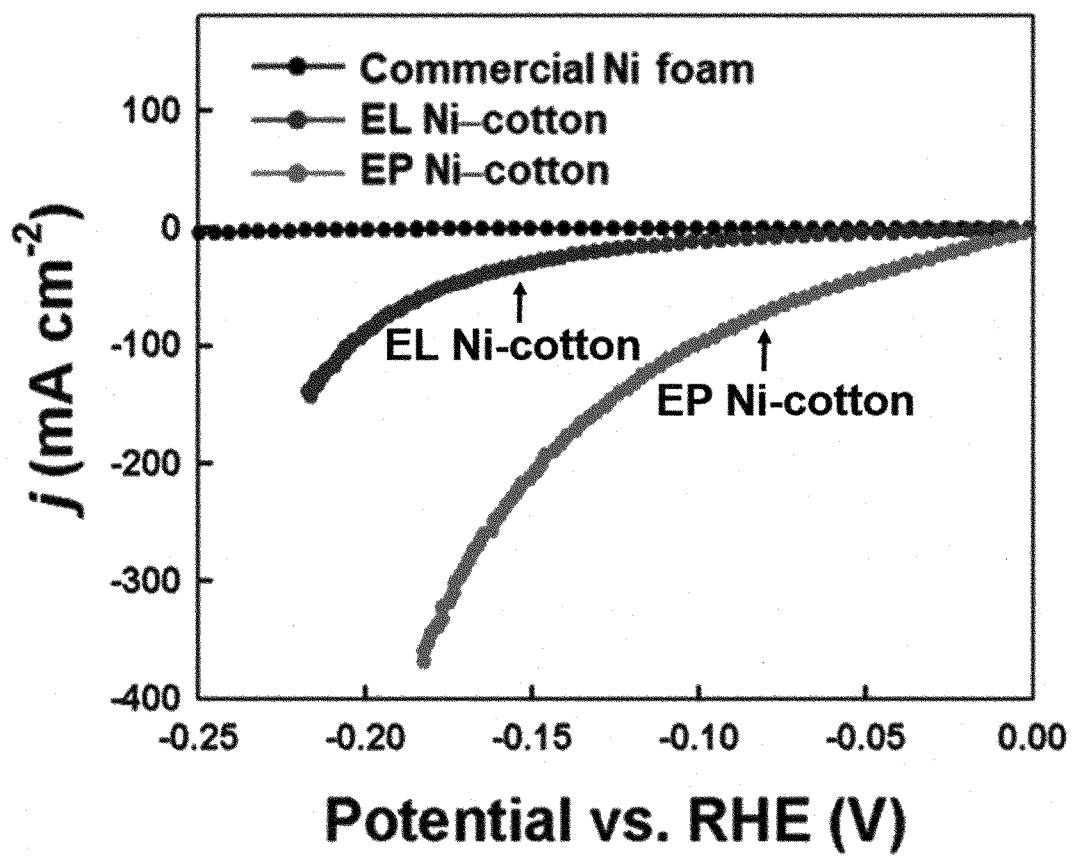

[Fig. 11b]
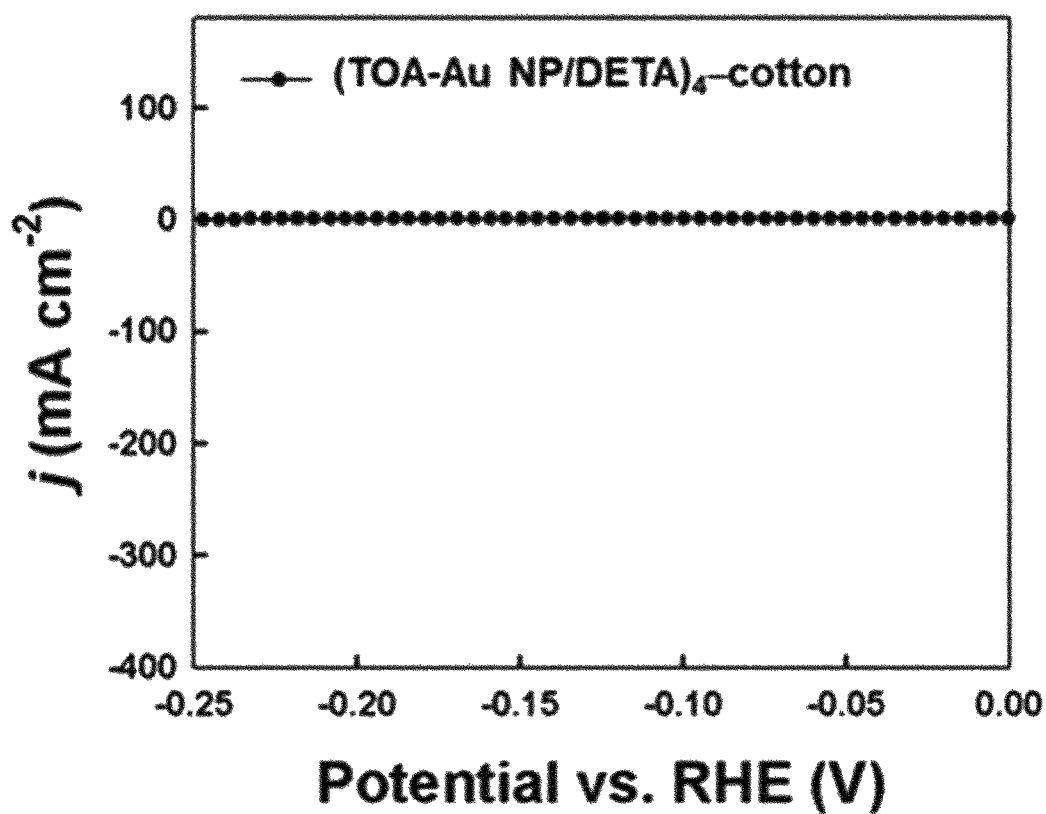

[Fig. 11c]
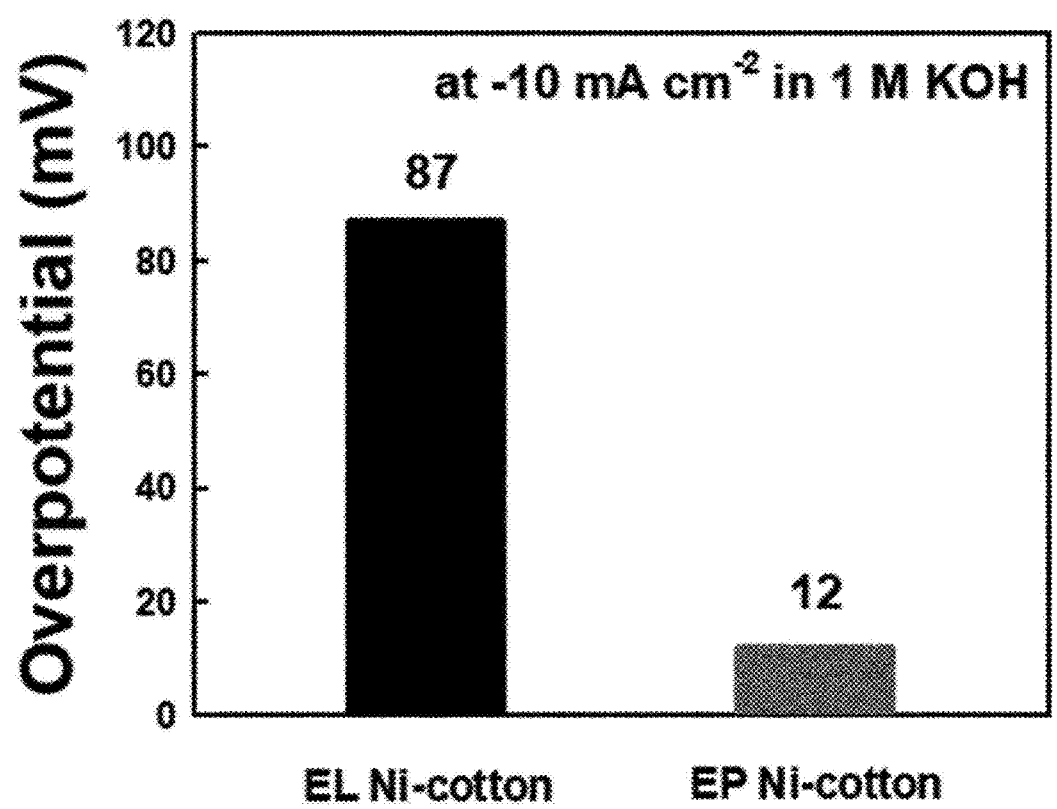

[Fig. 12]
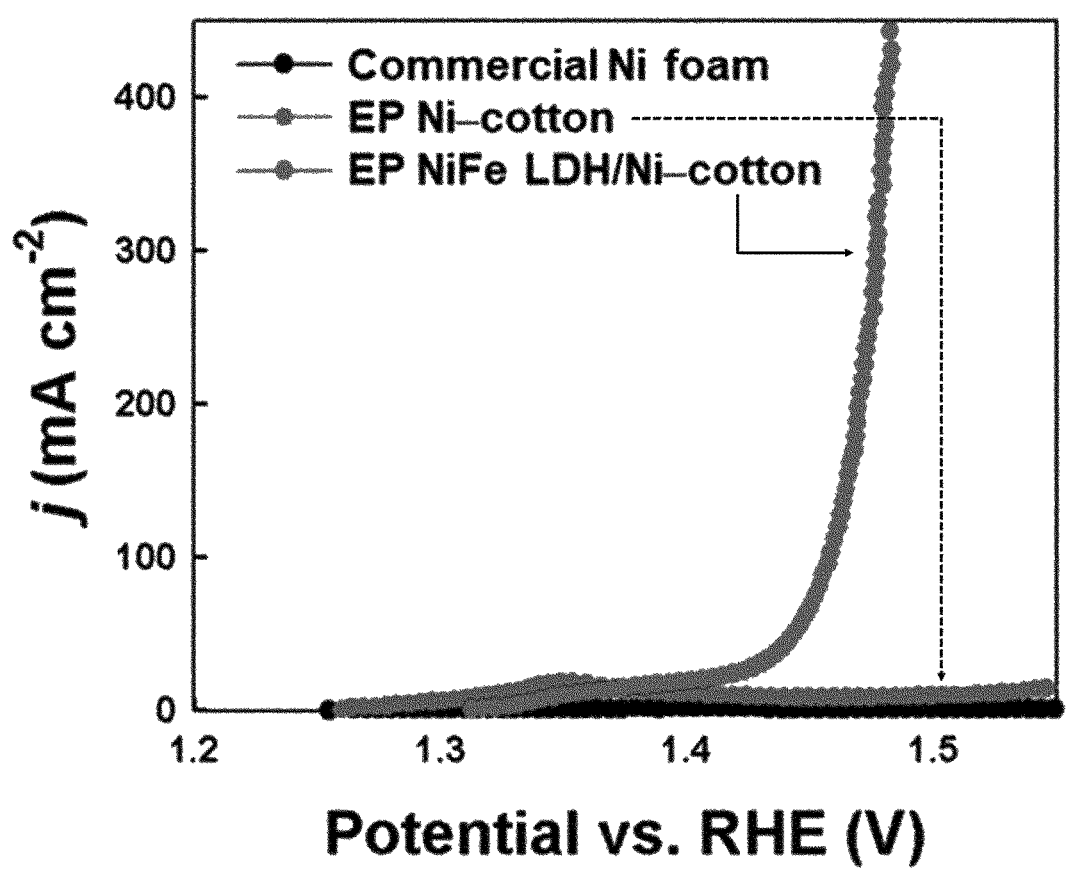

[Fig. 13a]
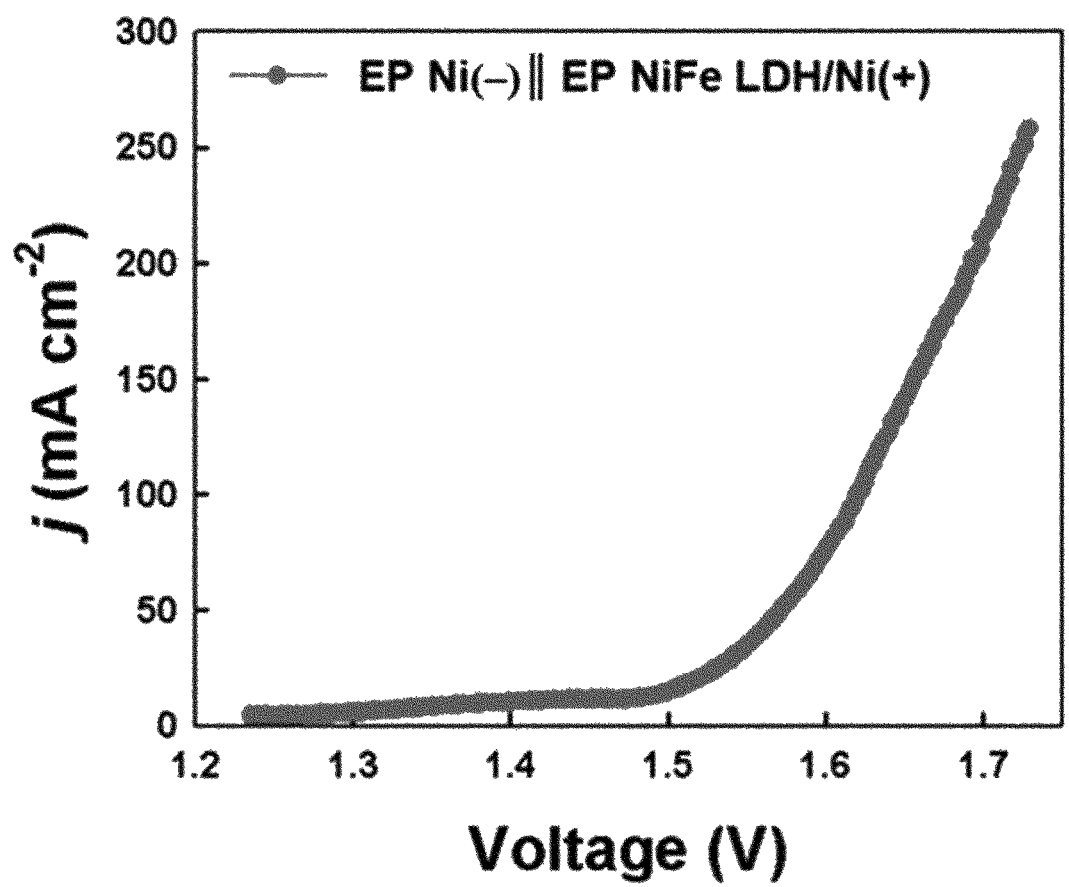

[Fig. 13b]
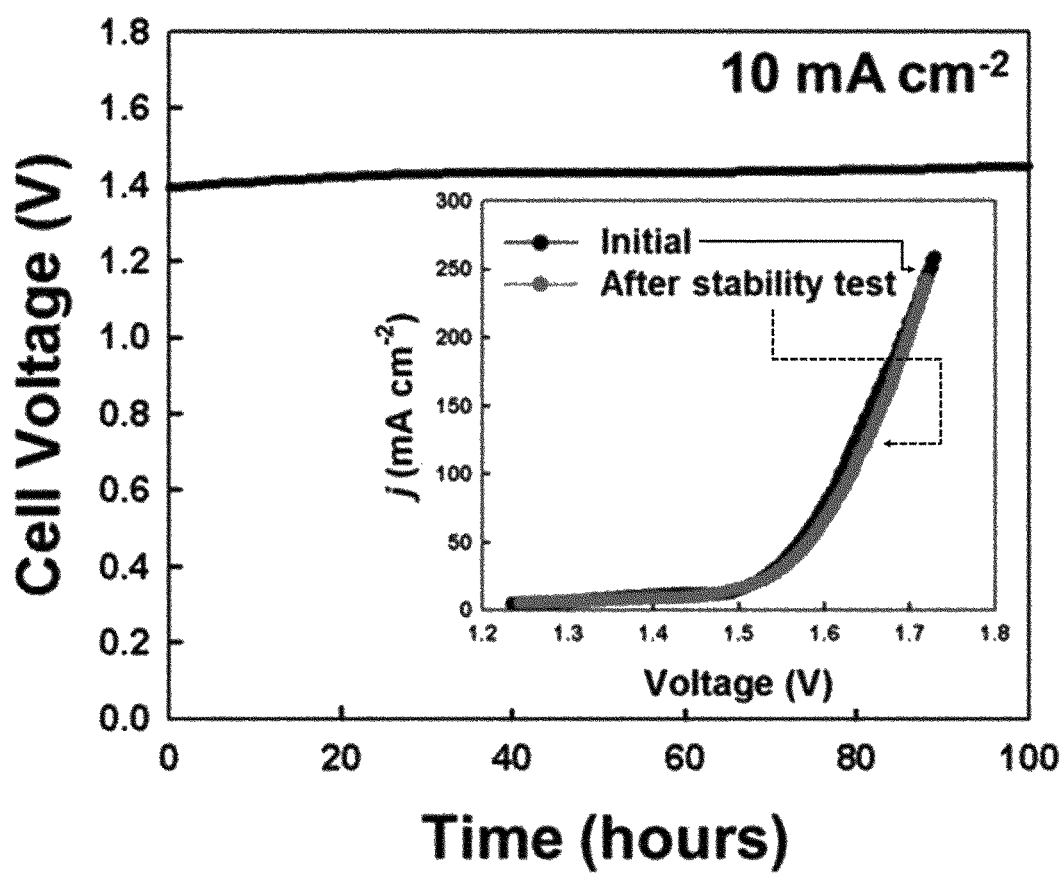

TEXTILE MATERIAL-BASED POROUS WATER SPLITTING CATALYST AND PREPARATION METHOD THEREFOR

CROSS REFERENCE TO RELATED APPLICATIONS

This application is a U.S. National Stage Application of International Application No. PCT/KR2020/004754, filed on Apr. 8, 2020, which claims the benefit under 35 USC 119 (a) and 365(b) of Korean Patent Application No. 10-2019-0050865, filed on Apr. 30, 2019, in the Korean Intellectual Property Office, the entire disclosure of which is incorporated herein by reference for all purposes.

TECHNICAL FIELD

The present invention relates to a fabric-based porous water splitting catalyst and a method for preparing the same. More specifically, the present invention relates to a porous water splitting catalyst that is based on a fabric and coated with a catalyst material by a simple electroplating process, and a method for preparing the water splitting catalyst.

BACKGROUND ART

As industrial development has progressed, fossil fuels such as coal, oil, and natural gas have been depleted and have caused environmental pollution and global warming. Thus, there is a need to develop energy sources that have the potential to replace fossil fuels. Under these circumstances, considerable research efforts have been made around the world to develop alternative energy technologies, including technologies for converting natural energy such as solar power, wind power, and tidal power into electrical energy and technologies for hydrogen energy production from natural resources such as water. Particularly, hydrogen is produced from water, which is one of the most abundant resources on earth, as a raw material and is a clean energy source that does not release pollutants when burned. In addition, hydrogen produces more energy per unit weight than any other energy source. Due to these advantages, hydrogen has attracted attention as a next-generation energy source. Hydrogen is typically produced by reforming under high temperature and pressure conditions. However, hydrogen production by reforming emits carbon dioxide, which is environmentally unfriendly. Due to this disadvantage, many research groups have focused on more efficient water splitting methods.

Only when water splitting catalysts have high performance for oxygen evolution reaction as well as hydrogen evolution reaction in the same electrolyte can their overall high performance for water splitting be expected. When water is catalytically split, the intermediates are repeatedly attached to and detached from the surface of the catalyst, which represents the activation energy of the catalyst. Accordingly, abundant active sites on the catalyst surface and fast charge migration are important for efficient hydrogen production.

Platinum (Pt) for the cathode and iridium (Ir) and ruthenium (Ru) for the anode have been mainly employed as catalyst materials for water splitting. These metals are produced and used in the form of nanoparticles or powders to ensure large surface areas. However, since the as produced metal nanoparticles or powders are difficult to use, they are blended with carbon black and a Nafion polymer and dropped onto glassy carbon before use. Further, the metals are expensive and the low hygroscopicity of the carbon black affects the contact areas between the catalytically active sites and electrolytes. The insulating material Nafion reduces charge transfer, eventually resulting in deterioration of catalytic performance.

Thus, there is an urgent need for a solution to the problems of conventional water splitting catalysts.

DETAILED DESCRIPTION OF THE INVENTION

Problems to be Solved by the Invention

The present invention has been made in an effort to solve the problems of the prior art and one aspect of the present invention is to provide a fabric-based porous water splitting catalyst in which a metal is uniformly coated on the surface of fibers constituting a porous insulating fabric support by electroplating, and a method for preparing the water splitting catalyst.

Means for Solving the Problems

A fabric-based porous water splitting catalyst according to an embodiment of the present invention includes: a porous fabric support made by interlacing a plurality of fibers; a bonding layer formed on the surface of the fibers; a conductive layer including a nanoparticle layer including metal nanoparticles and formed on the bonding layer and a monomolecular layer including an amine group ($NH_2$)-containing monomolecular material and formed on the nanoparticle layer; and a catalyst layer including a catalytic metal and formed by electroplating the catalytic metal on the conductive layer.

The fibers may be selected from the group consisting of cellulose fibers, polyester fibers, nylon fibers, acrylic fibers, and mixtures thereof.

The bonding layer may include an amine group ($NH_2$)-containing polymeric material.

The polymeric material may be selected from the group consisting of polyethylenimine (PEI), poly(allylamine hydrochloride) (PAH), and a mixture thereof.

The metal nanoparticles may be nanoparticles of one or more metals selected from the group consisting of Au, Ag, Al, Cu, and Pt.

The monomolecular material may be selected from the group consisting of tris(2-aminoethyl)amine (TREN), propane-1,2,3-triamine, diethylenetriamine (DETA), tetrakis (aminomethyl)methane, methanetetramine, and mixtures thereof.

The conductive layer may be provided in plurality and the plurality of conductive layers may be stacked together.

The conductive layer may have a sheet resistance of $10^0$ to $10^4$ $\Omega$/sq.

The catalytic metal may be selected from the group consisting of Ni, Co, Fe, Mo, Au, Ag, Cu, Cr, Ti, and alloys thereof.

The catalyst layer may include: a metal layer including the catalytic metal; and a hydroxide layer including a hydroxide of the catalytic metal and formed on the metal layer.

The catalytic metal present in the metal layer may be different from the catalytic metal of the catalytic metal hydroxide.

A method for preparing a fabric-based porous water splitting catalyst according to an embodiment of the present invention includes (a) preparing a first dispersion of a polymeric material and immersing a porous fabric support made by interlacing a plurality of fibers in the first dispersion to form a bonding layer on the surface of the fibers, (b) preparing a second dispersion of metal nanoparticles and immersing the fabric support on which the bonding layer is formed in the second dispersion to form a nanoparticle layer, (c) preparing a third dispersion of an amine group-containing monomolecular material and immersing the fabric support on which the nanoparticle layer is formed in the third dispersion to form a monomolecular layer, and (d) electroplating a catalytic metal to form a catalyst layer on the monomolecular layer.

Steps (b) and (c) may be sequentially repeated at least twice before step (d) to form at least two conductive layers stacked together, each of which includes the nanoparticle layer and the monomolecular layer stacked on the nanoparticle layer.

Step (d) may include electroplating a catalytic metal to form a metal layer and immersing the metal layer in an alkaline solution to form a hydroxide layer.

The features and advantages of the present invention will become apparent from the following description with reference to the accompanying drawings.

Prior to the detailed description of the invention, it should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

Effects of the Invention

According to the present invention, the metal is uniformly coated on all fiber strands constituting the porous insulating fabric structure by electroplating, ensuring excellent charge transporting properties of the water splitting catalyst and an electrical conductivity of the water splitting catalyst comparable to that of the metal.

In addition, the fabric structure maintains its porosity to provide a large surface area. Therefore, an electrolyte easily penetrates into the fabric structure and hydrogen and oxygen produced as a result of water splitting escape easily through the fabric structure, achieving high performance of the water splitting catalyst.

BRIEF DESCRIPTION OF THE DRAWINGS

FIG. 1 is a cross-sectional view of a fabric-based porous water splitting catalyst according to a first embodiment of the present invention.

FIG. 2 is a partial cross-sectional view of the fabric-based porous water splitting catalyst according to the first embodiment of the present invention.

FIG. 3 is a cross-sectional view of a fabric-based porous water splitting catalyst according to a second embodiment of the present invention.

FIG. 4 is a cross-sectional view of a fabric-based porous water splitting catalyst according to a third embodiment of the present invention.

FIGS. 5 and 6 are cross-sectional views of a fabric-based porous water splitting catalyst according to a fourth embodiment of the present invention.

FIGS. 7 and 8 are a flowchart and a diagram illustrating a method for preparing a fabric-based porous water splitting catalyst according to an embodiment of the present invention, respectively.

FIG. 9 shows changes in the sheet resistance of fabric-based porous water splitting catalysts prepared in Example 1 with increasing number (n) of conductive layers stacked in the catalysts.

FIGS. 10a to 10c are scanning electron microscopy (SEM) images of fabric-based porous water splitting catalysts prepared in Example 1.

FIGS. 11a to 11c show the results of evaluation of the activities of fabric-based porous water splitting catalysts prepared in Example 1 for hydrogen evolution reaction.

FIG. 12 shows the results of evaluation of the activities of fabric-based porous water splitting catalysts prepared in Example 1 for oxygen evolution reaction.

FIGS. 13a and 13b show the results of evaluation of the activities of fabric-based porous water splitting catalysts prepared in Example 1 for hydrogen and oxygen evolution reactions.

BEST MODE FOR CARRYING OUT THE INVENTION

Other objects, advantages, and novel features of the invention will become more apparent from the following detailed description and preferred embodiments with reference to the appended drawings. In the drawings, the same elements are denoted by the same reference numerals even though they are depicted in different drawings. Although such terms as "first" and "second," etc. may be used to describe various elements, these elements should not be limited by above terms. These terms are used only to distinguish one element from another. In the description of the present invention, detailed explanations of related art are omitted when it is deemed that they may unnecessarily obscure the essence of the present invention.

Preferred embodiments of the present invention will now be described in detail with reference to the accompanying drawings.

FIG. 1 is a cross-sectional view of a fabric-based porous water splitting catalyst according to a first embodiment of the present invention and FIG. 2 is a partial cross-sectional view of the fabric-based porous water splitting catalyst.

As illustrated in FIGS. 1 and 2, the fabric-based porous water splitting catalyst includes: a porous fabric support 10 made by interlacing a plurality of fibers 11; a bonding layer 20 formed on the surface of the fibers 11; a conductive layer 30 including a nanoparticle layer 31 including metal nanoparticles and formed on the bonding layer 20 and a monomolecular layer 33 including an amine group ($NH_2$)-containing monomolecular material and formed on the nanoparticle layer 31; and a catalyst layer 40 including a catalytic metal and formed by electroplating the catalytic metal on the conductive layer 30.

The present invention is directed to a fabric-based porous water splitting catalyst. Conventional water splitting catalysts use expensive metals, have small contact areas between the catalytically active sites and electrolytes, and suffer from poor charge transfer. The present invention has been made in view of the problems of conventional water splitting catalysts.

The fabric-based porous water splitting catalyst of the present invention includes a fabric support 10, a bonding layer 20, a conductive layer 30, and a catalyst layer 40.

The fabric support 10 is a substrate made by interlacing a plurality of fibers 11 and has a plurality of pores formed between the fibers 11. The constituent fibers 11 of the porous fabric support 10 are elongated linear objects. The fibers 11 may include both natural fibers and synthetic fibers. That is, the fabric support 10 may be made by spinning and weaving natural fibers, synthetic fibers or a blend thereof. The fibers 11 may be selected from the group consisting of, but not necessarily limited to, cellulose fibers, polyester fibers, nylon fibers, acrylic fibers, and mixtures thereof. The fibers are not limited to a particular type as long as they cross each other to form a predetermined shape of the fabric support 10.

The plurality of fibers 11 are typically woven into the fabric support 10. However, the scope of the present invention is not limited to weaving and any technique for forming a two- or three-dimensional shape of the fabric support 10 may be used. Examples of such techniques include techniques for making general paper or traditional Korean paper ("Hanji") by dispersing fibers in water such that the fibers are thinly entangled. The fabric support 10 made of the fibers 11 has a plurality of fine pores that extend from the outer surface to the interior thereof. The fabric support 10 may be electrically non-conductive depending on the type of the fibers 11. The fabric support 10 supports the conductive layer 30 and the catalyst layer 40. The conductive layer 30 is bonded to the fabric support 10 via the bonding layer 20.

The bonding layer 20 is a layer formed by adsorbing a polymeric material to the fabric support 10. The polymeric material allows for the coating of metal nanoparticles on the fabric support 10 to form a nanoparticle layer 31, which will be described below. The polymeric material can be not only adsorbed to the surface of the fabric support 10, that is, the outer fibers exposed to the outside, but also can penetrate into the fabric support 10 through the pores of the fabric support 10 and adsorbed to the outer surface of the inner fibers 11, as illustrated in FIG. 2. The polymeric material may contain amine groups ($NH_2$) having a strong affinity for metal nanoparticles. For example, the polymeric material may be selected from the group consisting of, but not necessarily limited to, polyethylenimine (PEI), poly(allylamine hydrochloride) (PAH), and a mixture thereof. The polymeric material is not particularly limited as long as it can fix metal nanoparticles to the surface of the fibers 11.

The conductive layer 30 has a bilayer structure consisting of a nanoparticle layer 31 formed on the bonding layer 20 and a monomolecular layer 33 stacked on the nanoparticle layer 31. The nanoparticle layer 31 is formed of metal nanoparticles on the bonding layer 20. The nanoparticle layer 31 is fixed to the fabric support 10 by the bonding layer 20, as described above. The nanoparticle layer 31 is formed on the inner and outer fibers 11 of the fabric support 10. The metal nanoparticles may be nanoparticles of one or more metals selected from the group consisting of, but not necessarily limited to, Au, Ag, Al, Cu, and Pt.

The monomolecular layer 33 is a layer formed by coating a monomolecular material on the nanoparticle layer 31. The monomolecular material contains one or more amine groups ($NH_2$) and may be selected from the group consisting of, but not necessarily limited to, tris(2-aminoethyl)amine (TREN), propane-1,2,3-triamine, diethylenetriamine (DETA), tetrakis(aminomethyl)methane, methanetetramine, and mixtures thereof. The monomolecular material is not particularly limited as long as it contains one or more amine groups. The monomolecular material together with the polymeric material fixes the metal nanoparticles and imparts electrical conductivity to the nanoparticle layer 31. A thin film composed of metal particles surrounded by long organic ligands exhibits insulating properties. In contrast, the amine group-containing polymeric material (for the bonding layer 20) and the amine group-containing monomolecular material (for the monomolecular layer 33) replace insulating organic ligands to improve the bonding strength between the metal nanoparticles and impart electrical conductivity to the nanoparticle layer 31.

The conductive layer 30 has minimal electrical conductivity for electroplating such that the catalyst layer 40 is formed by electroplating. The conductive layer 30 may have a sheet resistance ranging from $10^0$ to $10^4$ $\Omega$/sq. Within this range, electroplating can be effectively performed. However, the sheet resistance of the conductive layer 30 is not necessarily limited to the range defined above and may be determined depending on the types of the metal nanoparticles and the monomolecular material and the structure of the conductive layer 30, which will be described below.

The catalyst layer 40 is a layer formed by electroplating a catalytic metal on the conductive layer 30. The catalytic metal is a metal that has catalytic activity for water splitting. For example, the catalytic metal may be selected from the group consisting of, but not necessarily limited to, Ni, Co, Fe, Mo, Au, Ag, Cu, Cr, Ti, and alloys thereof. That is, the catalyst layer 40 may be formed of any of the metals and alloys thereof. The alloys may be, for example, NiCo and NiFe. Any catalytic metal that can be coated on the conductive layer 30 by electroplating and has catalytic activity for water splitting may be used without limitation. Electroplating enables uniform coating of the catalytic metal at a high density on the outer surface of the fibers 11 of the fabric support 10. Since the conductive layer 30 is formed on the outer surface of the fibers 11 while maintaining the porosity of the fabric support 10, the catalyst layer 40 can be uniformly formed on the inner and outer fibers 11 of the fabric support 10 and thus its surface area increases. As a result, the fabric-based porous water splitting catalyst of the present invention has a high electrical conductivity at a level comparable to that of the metal and provides a large surface area through which an electrolyte can penetrate easily and hydrogen and oxygen produced by the splitting of water can escape easily. The electroplating is performed in a simple manner within a short time, reducing the time it takes to prepare the catalyst and enabling the preparation of the catalyst at low cost in an efficiently controlled manner.

FIG. 3 is a cross-sectional view of a fabric-based porous water splitting catalyst according to a second embodiment of the present invention.

Referring to FIG. 3, the fabric-based porous water splitting catalyst has a structure in which two or more conductive layers 30 are stacked together, that is, a second conductive layer 30b is stacked on a first conductive layer 30a or another conductive layer 30 may be optionally stacked thereon. The same or different materials may be used for constituent nanoparticle layers 31 and monomolecular layers 33 of the different conductive layers 30. For example, Au nanoparticles may be used for a nanoparticle layer 31a of the first conductive layer 30a, DETA may be used as a monomolecular material for a monomolecular layer 33a of the first conductive layer 30a, Ag nanoparticles may be used for a nanoparticle layer 31b of the second conductive layer 30b, and TREN may be used as a monomolecular material for a monomolecular layer 33b of the second conductive layer 30b. In this case, the conductive layer 30 has an (Au/DETA)/(Ag/TREN) bilayer structure.

FIG. 4 is a cross-sectional view of a fabric-based porous water splitting catalyst according to a third embodiment of the present invention and corresponds to a cross-sectional view taken along line A-A' of FIG. 2.

As illustrated in FIG. 4, the fabric-based porous water splitting catalyst may include a catalyst layer 40 including a metal layer 41 and a hydroxide layer 43.

The metal layer 41 is a layer including a catalytic metal and is formed by electroplating, as described above. For example, the metal layer 41 may be a Ni electroplated layer.

The hydroxide layer 43 is a layer including a hydroxide of the catalytic metal. The metal layer 41 and the hydroxide layer 43 act as catalytically active materials. The hydroxide layer 43 may be formed by immersing a fabric support 10 on which the metal layer 41 is formed in an alkaline solution. For example, a $Ni(OH)_2$ layer as the hydroxide layer 43 may be formed on the surface of a Ni layer as the metal layer 41 by immersing the Ni layer in a KOH solution. At this time, the $Ni(OH)_2$ can cleave the HO—O bond and the Ni is adsorbed by the cleavage intermediate $H_{ad}$. The Ni serves as a central material that recombines the adsorbed $H_{ad}$ into hydrogen. Accordingly, the metal layer 41 and the hydroxide layer 43 as catalytically active materials can form a single catalyst electrode without using an additional binder.

FIGS. 5 and 6 are cross-sectional views of a fabric-based porous water splitting catalyst according to a fourth embodiment of the present invention (see the cross-sectional view taken along line A-A' of FIG. 2).

In the embodiment illustrated in FIGS. 5 and 6, two or more catalyst layers 40 are stacked together. That is, the catalyst layers 40 may be a first catalyst layer 40a and a second catalyst layer 40b formed on the first catalyst layer 40a. Each of the catalyst layers 40 may include a metal layer 41 and optionally further include a hydroxide layer 43. The metal layer 41 and the hydroxide layer 43 are the same as those described above. For example, only the metal layer 41 may be provided as the first catalyst layer 40 and a combination of the metal layer 41 and the hydroxide layer 43 may be provided as the second catalyst layer 40 to form a (metal layer)/(metal layer/hydroxide layer) structure, as illustrated in FIG. 6. Alternatively, two catalyst layers 40 may be stacked together to form a (metal layer/hydroxide layer)/(metal layer/hydroxide layer), (metal layer/hydroxide layer)/(metal layer) or (metal layer)/(metal layer) structure. Alternatively, three or more catalyst layers 40 may be stacked together to form a (metal layer)/(metal layer)/(metal layer/hydroxide layer) or (metal layer)/(metal layer/hydroxide layer)/(metal layer) structure. The constituent metal layers 41 of the catalyst layers 40 do not necessarily have to be formed of the same catalytic metal. Different catalytic metals may be used for the metal layers 41 of the catalyst layers 40. In the case where different catalytic metals are used in the catalyst layers 40, the catalytic metal for the metal layer 41 of one of the catalyst layers 40 may be different from the catalytic metal for the hydroxide layer 43 (i.e. the catalytic metal before hydroxide formation).

MODE FOR CARRYING OUT THE INVENTION

A description will be given of a method for preparing a fabric-based porous water splitting catalyst according to the present invention. The fabric-based porous water splitting catalyst is the same as that described above and a detailed description thereof is omitted or only briefly presented to avoid duplication.

FIGS. 7 and 8 are a flowchart and a diagram illustrating a method for preparing a fabric-based porous water splitting catalyst according to an embodiment of the present invention, respectively.

As illustrated in FIGS. 7 and 8, the method includes (a) preparing a first dispersion of a polymeric material and immersing a porous fabric support made by interlacing a plurality of fibers in the first dispersion to form a bonding layer on the surface of the fibers (S100), (b) preparing a second dispersion of metal nanoparticles and immersing the fabric support on which the bonding layer is formed in the second dispersion to form a nanoparticle layer (S200), (c) preparing a third dispersion of an amine group-containing monomolecular material and immersing the fabric support on which the nanoparticle layer is formed in the third dispersion to form a monomolecular layer (S300), and (d) electroplating a catalytic metal to form a catalyst layer on the monomolecular layer (S400).

Briefly, the method includes forming a bonding layer (S100), forming a nanoparticle layer (S200), forming a monomolecular layer (S300), and forming a catalyst layer (S400).

In S100, a bonding layer is formed on the surface of fibers constituting a fabric support. Specifically, a first dispersion of a polymeric material is prepared and a fabric support is immersed therein to form a bonding layer. The fabric support is a porous substrate made by interlacing a plurality of fibers. The first dispersion penetrates into the fabric support through the pores of the fabric support and the polymeric material is adsorbed to the surface of the inner fibers as well as the surface of the outer fibers. The fibers may be selected from the group consisting of, but not necessarily limited to, cellulose fibers, polyester fibers, nylon fibers, acrylic fibers, and mixtures thereof. The polymeric material is a polymer containing amine groups and may be selected from the group consisting of, but not necessarily limited to, polyethylenimine (PEI), poly(allylamine hydrochloride) (PAH), and a mixture thereof. Any solvent that can disperse the polymeric material to form a bonding layer on the surface of the fibers may be used to prepare the first dispersion. The solvent for the first dispersion is not particularly limited and may be, for example, ethanol.

In S200, metal nanoparticles are coated on the bonding layer to form a nanoparticle layer. Specifically, a second dispersion of metal nanoparticles is prepared and the fabric support on which the bonding layer is formed is immersed in the second dispersion to form a nanoparticle layer. Since the pores of the fabric support are not closed by the bonding layer, the second dispersion penetrates into the fabric support through the pores of the fabric support and coated on the bonding layer adsorbed to the surface of the fibers. The metal nanoparticles may be nanoparticles of one or more metals selected from the group consisting of, but not necessarily limited to, Au, Ag, Al, Cu, and Pt. The second dispersion may be prepared by dispersing the metal nanoparticles in a suitable solvent, including but not necessarily limited to toluene.

In S300, an amine group-containing monomolecular material is used to form a thin monomolecular layer. Specifically, an amine group-containing monomolecular material is dispersed in a suitable solvent such as ethanol to prepare a third dispersion and the fabric support on which the nanoparticle layer is formed in the third dispersion to form a monomolecular layer. The third dispersion penetrates into the fabric support through the pores of the fabric support and the monomolecular material is coated on the nanoparticle layer formed on the surface of the outer and inner fibers to form a monomolecular layer. The monomolecular material may be selected from the group consisting of, but not necessarily limited to, tris(2-aminoethyl)amine (TREN), propane-1,2,3-triamine, diethylenetriamine (DETA), tetrakis(aminomethyl)methane, methanetetramine, and mixtures thereof. The nanoparticle layer and the monomolecular layer stacked on the nanoparticle layer form a conductive layer.

The conductive layer has the lowest possible electrical conductivity such that a catalyst layer is formed by electroplating. The sheet resistance of the conductive layer is preferably in the range of $10^0$ to $10^4$ Ω/sq. This range can be achieved by appropriately selecting the type of the metal nanoparticles or forming the conductive layer in a multilayer structure. Referring to FIG. 8, two or more conductive layers can be formed by sequentially repeating S200 and S300 several times ("layer-by-layer assembly"). In this case, the same materials may be used for the constituent metal nanoparticle layers and monomolecular layers of the different conductive layers. Alternatively, at least one of these materials may be replaced by a different material.

In S400, a catalytic metal is electroplated on the conductive layer. The catalytic metal may be selected from the group consisting of, but not particularly limited to, Ni, Co, Fe, Mo, Au, Ag, Cu, Cr, Ti, and alloys thereof. The catalytic metal may be any catalytically active metal (or alloy). The layer formed by electroplating the catalytic metal is defined as a metal layer. The catalyst layer may further include a hydroxide layer. The hydroxide layer may be formed by immersing the metal layer in an alkaline solution. The alkaline solution may be, for example, a KOH solution. The alkaline solution is not particularly limited as long as it can chemically react with the metal layer to form a hydroxide layer on the surface of the metal layer.

The catalyst layer may be provided in plurality and the plurality of catalyst layers may be stacked together. Each of the catalyst layers may optionally further include a hydroxide layer in addition to the metal layer. To this end, electroplating and immersion in an alkaline solution are selectively performed.

The present invention will be more specifically explained with reference to Example 1 and Evaluation Examples 1-5.

Example 1: Preparation of Fabric-Based Porous Water Splitting Catalysts

PEI having amine groups was dispersed to a concentration of 2 mg/mL in ethanol to prepare a first dispersion. Thereafter, a porous fabric support made of cellulose ("cellulose substrate") was immersed in the first dispersion for 3 h, washed twice with ethanol, and dried with a dryer. Au nanoparticles were hydrophobically stabilized with tetraoctylammonium bromide (TOABr) and dispersed in toluene to prepare a second dispersion. Then, the fabric support was immersed in the second dispersion for 1 h, washed twice with toluene, dried with a dryer, and immersed in a 2 mg/mL solution of diethylenetriamine (DETA) in ethanol (third dispersion) for 30 min. DETA is a monomolecular compound having amine groups. Likewise, the fabric support was washed twice with ethanol and dried. The sequential immersions in the second and third dispersions resulted in the formation of a (TOABr-Au NP/DETA) structure in which the Au nanoparticles and the monomolecular compound DETA were stacked on the TOABr by layer-by-layer assembly. Au nanoparticles and DETA as a monomolecular compound were alternately stacked on the structure to form conductive layers (cotton/PEI/(TOABr-Au/DETA)$_n$) until a sheet resistance of $10^0$-$10^4$ Ω/sq was reached.

Then, electroplating was performed with a Ni plating solution in a Watt's bath at 1.3 A for 30 min. The type and composition of the plating solution varied depending on a desired plating metal. Specifically, the fabric support as a cathode and a desired plating metal as an anode were immersed in an electrolyte solution and connected to a power supply. Electricity was applied to both electrodes to form a catalyst layer on the conductive layer stack. The plated fabric support was washed twice with deionized water (DI). Thereafter, NiFe plating was performed once.

The plated fabric support was placed in a vacuum oven at 150° C., dried for 3 h, immersed in a 0.1 M KOH solution for 1 h, washed twice with DI, and dried.

The resulting water splitting catalysts had the following structures: cotton/PEI/(TOABr-Au NP/DETA)$_4$/Ni, cotton/PEI/(TOABr-Au NP/DETA)$_4$/NiCo, cotton/PEI/(TOABr-Au NP/DETA)$_4$/Ni/NiFe, and cotton/PEI/(TOABr-Au NP/DETA)$_4$/Ni/Ni(OH)$_2$.

Evaluation Example 1: Analysis of Relationships Between Number of the Conductive Layers and Sheet Resistance Values The sheet resistance values of the cotton/PEI/(TOABr-Au/DETA)$_n$ samples prepared in Example 1 were measured with increasing number (n) of the conductive layers (TOABr-Au/DETA) stacked in the samples. The results are shown in FIG. 9.

Referring to FIG. 9, the number of the stacked conductive layers was in inverse relationship with sheet resistance. In Example 1, the number of the conductive layers formed by plating was 4, each of the conductive layers had a bilayer structure, and the sheet resistance before plating was $10^0$-$10^4$ Ω/sq.

Evaluation Example 2: Analysis of Structure of the Fabric-Based Porous Water Splitting Catalysts FIGS. 10a to 10c are scanning electron microscopy (SEM) images of the fabric-based porous water splitting catalysts prepared in Example 1. Specifically, FIGS. 10a, 10b, and 10c show planar and cross-sectional SEM images of the cotton/PEKTOABr-Au NP/DETA)$_4$/Ni, cotton/PEKTOABr-Au NP/DETA)$_4$/Ni/NiFe, and cotton/PEKTOABr-Au NP/DETA)$_4$/NiCo samples, respectively.

Analysis of the cross-sectional SEM data shown in FIGS. 10a, 10b, and 10c revealed that the materials used such as Au, Ni, Co, and Fe were evenly coated without loss, projections were formed on the electrode surface after Ni plating, and wrinkles were formed on the surface after NiFe plating.

Evaluation Example 3: Evaluation of Activity for Hydrogen Evolution Reaction FIGS. 11a to 11c show the results of evaluation of the activities of the fabric-based porous water splitting catalysts prepared in Example 1 for hydrogen evolution reaction.

The electrochemical catalytic properties of the cotton/PEKTOABr-Au NP/DETA)$_4$ sample and the cotton/PEI/(TOABr-Au NP/DETA)$_4$/Ni/Ni(OH)$_2$ sample prepared in Example 1 were measured. First, each of the samples was cut to a size of 0.5 cm×1 cm, finished with epoxy except for a measurement portion (0.5 cm×0.5 cm) and a portion held by tongs, and connected to a reversible hydrogen electrode (RHE) as a reference electrode and a Pt mesh as a counter electrode in a three-electrode system in a 1 M KOH electrolyte. The current densities (j, mA cm$^{-2}$) of the catalyst were measured with varying potentials (V, vs RHE). The results are shown in FIGS. 11a and 11b. The overpotential (V) of an electroless Ni plated sample (EL: electroless deposition) was compared with that of the Ni electroplated sample (EP: electroplating) (see FIG. 11a). The results are shown in FIG. 11c.

The activities of a commercial Ni foam, the electroless Ni plated sample (EL Ni-cotton), and the Ni electroplated sample (EP Ni-cotton) for hydrogen evolution reaction (HER) in a 1 M KOH electrolyte were compared (see FIG. 11a). As a result, the Ni electroplated catalyst showed the highest performance. The TOABr-Au nanoparticles did not contribute to the activity of the Ni electroplated catalyst for hydrogen evolution reaction (see FIG. 11b).

The overpotentials of the electroless plated sample (EL Ni-cotton) and the electroplated sample (EP Ni-cotton), which had the same cotton thickness, at $-10$ mA cm$^{-2}$ were measured to be 87 mV and 12 mV, respectively, demonstrating that the performance of the Ni electroplated catalyst was higher than that of the electroless plated Ni catalyst (see FIG. 11c).

Evaluation Example 4: Evaluation of Activity for Oxygen Evolution Reaction

FIG. 12 shows the results of evaluation of the activities of the fabric-based porous water splitting catalysts prepared in Example 1 for oxygen evolution reaction.

The activities of a commercial Ni foam, the Ni electroplated sample (EP Ni-cotton), and the NiFe electroplated sample (EP NiFe LDH/Ni-cotton) for oxygen evolution reaction were evaluated. To this end, each of the samples was connected to a reversible hydrogen electrode (RHE) as a reference electrode and a Pt mesh as a counter electrode in a three-electrode system in a 1 M KOH electrolyte and the current densities (j, mA cm$^{-2}$) of the catalyst were measured with varying potentials (V, vs RHE). As a result, the additional NiFe electroplating on the Ni plated layer led to an improvement in catalytic performance.

Evaluation Example 5: Evaluation of Activity for Hydrogen and Oxygen Evolution Reactions FIGS. 13a and 13b show the results of evaluation of the activities of the fabric-based porous water splitting catalysts prepared in Example 1 for hydrogen and oxygen evolution reactions.

The activities of the water splitting catalysts for water splitting were measured. To this end, the Ni electroplated sample was connected to a cathode (−) and the NiFe electroplated sample was connected to an anode (+) in a 1 M KOH electrolyte. The cell voltages at 10, 50, and 100 mA cm$^{-2}$ were measured to be 1.39, 1.57, and 1.62 V, respectively (see FIG. 13a).

Referring to FIG. 13b, when a constant current density of 10 mA cm$^{-2}$ was applied to both electrodes, almost no change in cell potential was observed for 100 h. The current density (j)-voltage curves before and after stability test matched well, demonstrating high stability of the catalysts.

Although the present invention has been described herein with reference to the foregoing specific embodiments, these embodiments do not serve to limit the invention and are set forth for illustrative purposes. It will be apparent to those skilled in the art that modifications and improvements can be made without departing from the spirit and scope of the invention.

Simple modifications and changes of the present invention belong to the scope of the present invention and the specific scope of the present invention will be clearly defined by the appended claims.

[Explanation of reference numerals]

| | |
|---|---|
| 10: Fabric support | 11: Fiber |
| 20: Bonding layer | 30: Conductive layer |
| 31: Nanoparticle layer | 33: Monomolecular layer |
| 40: Catalyst layer | 41: Metal layer |
| 43: Hydroxide layer | |

INDUSTRIAL APPLICABILITY

In the water splitting catalyst of the present invention, the metal is uniformly coated on all fiber strands constituting the porous insulating fabric structure by electroplating. This uniform coating ensures excellent charge transporting properties of the water splitting catalyst and an electrical conductivity of the water splitting catalyst comparable to that of the metal. Therefore, the present invention is considered industrially applicable.

The invention claimed is:

1. A fabric-based porous water splitting catalyst comprising: a porous fabric support made by interlacing a plurality of fibers; a bonding layer formed on the surface of the fibers; a conductive layer comprising a nanoparticle layer comprising metal nanoparticles and formed on the bonding layer and a monomolecular layer comprising an amine group (NH$_2$)-containing monomolecular material and formed on the nanoparticle layer; and a catalyst layer comprising a catalytic metal and formed by electroplating the catalytic metal on the conductive layer.

2. The fabric-based porous water splitting catalyst according to claim 1, wherein the fibers are selected from the group consisting of cellulose fibers, polyester fibers, nylon fibers, acrylic fibers, and mixtures thereof.

3. The fabric-based porous water splitting catalyst according to claim 1, wherein the bonding layer comprises an amine group (NH$_2$)-containing polymeric material.

4. The fabric-based porous water splitting catalyst according to claim 3, wherein the polymeric material is selected from the group consisting of polyethylenimine (PEI), poly (allylamine hydrochloride) (PAH), and a mixture thereof.

5. The fabric-based porous water splitting catalyst according to claim 1, wherein the metal nanoparticles are nanoparticles of one or more metals selected from the group consisting of Au, Ag, Al, Cu, and Pt.

6. The fabric-based porous water splitting catalyst according to claim 1, wherein the monomolecular material is selected from the group consisting of tris (2-aminoethyl) amine (TREN), propane-1,2,3-triamine, diethylenetriamine (DETA), tetrakis (aminomethyl) methane, methanetetramine, and mixtures thereof.

7. The fabric-based porous water splitting catalyst according to claim 1, wherein the conductive layer is provided in plurality and the plurality of conductive layers are stacked together.

8. The fabric-based porous water splitting catalyst according to claim 1, wherein the conductive layer has a sheet resistance of 10$^0$ to 10$^4$ Ω/sq.

9. The fabric-based porous water splitting catalyst according to claim 1, wherein the catalytic metal is selected from the group consisting of Ni, Co, Fe, Mo, Au, Ag, Cu, Cr, Ti, and alloys thereof.

10. The fabric-based porous water splitting catalyst according to claim 1, wherein the catalyst layer comprises: a metal layer comprising the catalytic metal; and a hydroxide layer comprising a hydroxide of the catalytic metal and formed on the metal layer.

11. The fabric-based porous water splitting catalyst according to claim 10, wherein the catalytic metal present in the metal layer is different from the catalytic metal of the catalytic metal hydroxide.

12. A method for preparing a fabric-based porous water splitting catalyst, comprising (a) preparing a first dispersion of a polymeric material and immersing a porous fabric support made by interlacing a plurality of fibers in the first dispersion to form a bonding layer on the surface of the fibers, (b) preparing a second dispersion of metal nanoparticles and immersing the fabric support on which the bonding layer is formed in the second dispersion to form a nanoparticle layer, (c) preparing a third dispersion of an amine group-containing monomolecular material and immersing the fabric support on which the nanoparticle layer is formed in the third dispersion to form a monomolecular layer, and (d) electroplating a catalytic metal to form a catalyst layer on the monomolecular layer.

13. The method according to claim 12, wherein steps (b) and (c) are sequentially repeated at least twice before step (d) to form at least two conductive layers stacked together, each of which comprises the nanoparticle layer and the monomolecular layer stacked on the nanoparticle layer.

14. The method according to claim 12, wherein step (d) comprises electroplating a catalytic metal to form a metal layer and immersing the metal layer in an alkaline solution to form a hydroxide layer.

* * * * *